Oct. 26, 1965    H. HARTMANN ETAL    3,213,697
INFINITELY VARIABLE TRANSMISSION
Filed April 16, 1963    3 Sheets-Sheet 1

INVENTORS
HEINZ HARTMANN
ADOLF WEBER

BY Lindsey, Prutzman and Hayes
ATTORNEYS

Oct. 26, 1965  H. HARTMANN ETAL  3,213,697
INFINITELY VARIABLE TRANSMISSION
Filed April 16, 1963  3 Sheets-Sheet 2
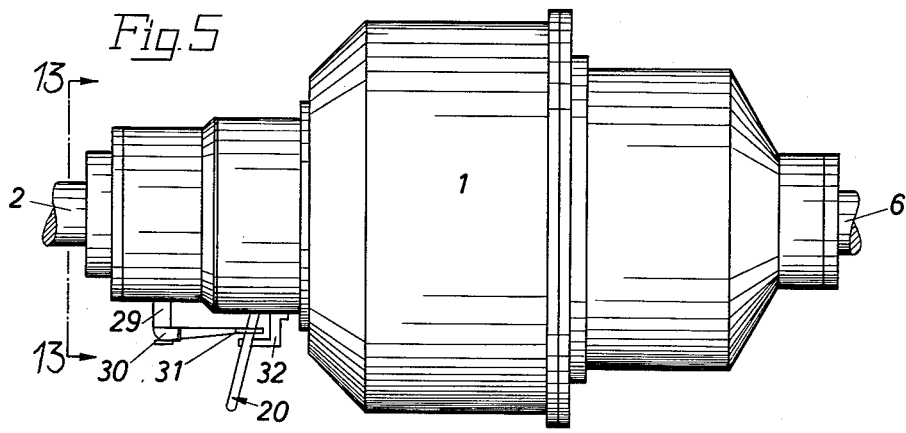
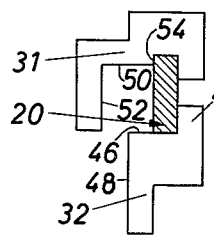 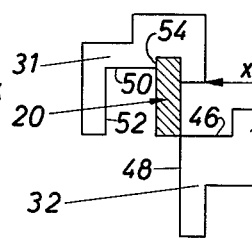 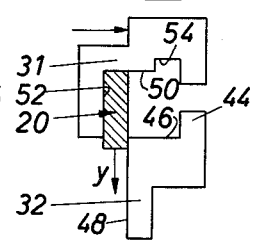
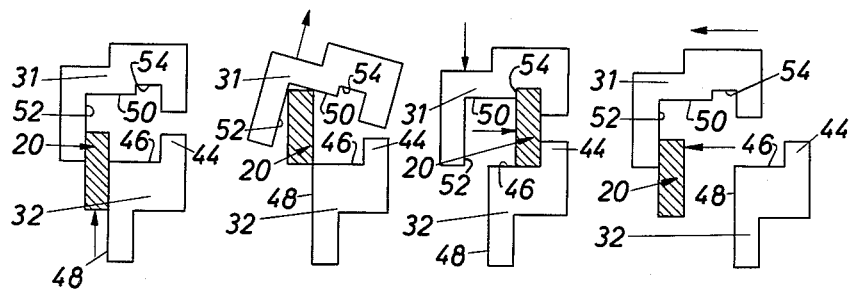
INVENTORS
HEINZ HARTMANN
ADOLF WEBER
BY *Lindsey, Prutzman and Hayes*
ATTORNEYS United States Patent Office 3,213,697
Patented Oct. 26, 1965

3,213,697
INFINITELY VARIABLE TRANSMISSION
Heinz Hartmann, Essen (Ruhr), and Adolf Weber, Velbert, Rhineland, Germany, assignors to Stanley-Works G.m.b.H., Velbert, Rhineland, Germany, a corporation of Germany
Filed Apr. 16, 1963, Ser. No. 273,493
Claims priority, application Germany, Apr. 27, 1962, St 19,152
6 Claims. (Cl. 74—117)

The present invention relates to transmissions, and more particularly to a transmission shitfable for infinitely varying its drive ratio between predesigned limits.

It is a principal aim of the present invention to provide a new and improved infinitely variable transmission that is readily and accurately shiftable for providing any drive ratio within its predesigned limits and which is conveniently adaptable for manual shifting and/or for automatic shifting as for maintaining a constant output torque or speed.

Another aim of the present invention is to provide an infinitely variable transmission having a minimum number of movable parts associated in a compact, sturdy, and economical assembly which ensures dependable and service-free operation over a long useful life.

A further aim of the present invention is to provide a new and improved infinitely variable transmission adaptable for providing a drive ratio between a minium ratio of zero (0) giving essentially a neutral drive, and a predesigned maximum ratio.

Other objects will be in part obvious and in part pointed out more in detail hereinafter.

The invention accordingly consists in the features of construction, combination of elements and arrangement of parts which will be exemplified in the construction heretafter set forth, and the scope of the application of which will be indicated in the appended claims.

In the drawings:

FIG. 5 is a side elevation view of the transmission;

FIGS. 6–12 are enlarged views of a portion of FIG. 14 with the shifting mechanism of the transmission in several positions;

Figure 1:
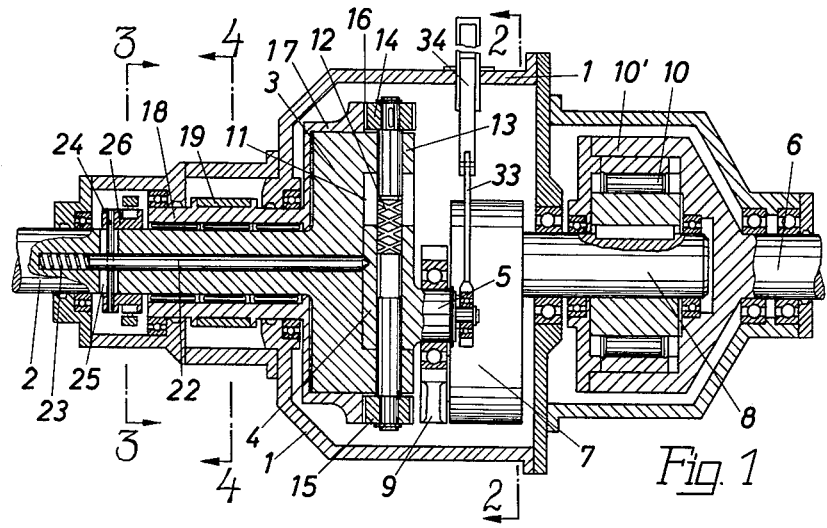
FIG. 1 is a longitudinal section view, partly broken away, of a preferred embodiment of the infinitely variable transmission of the present invention.

Referring now to the drawings in detail, a preferred embodiment of the infinitely variable transmission of the present invention is shown compactly assembled within a housing 1 rotatably supporting through suitable bearings a drive shaft 2 and coaxial driven and intermediate shafts 6 and 8, respectively, which extend parallel to but are laterally offset from the drive shaft. The intermediate shaft 8 extends axially within an enlarged clutch housing 10' of a one-way clutch 10. The clutch housing 10' is integrally connected to the drive shaft 6 and the intermediate shaft is keyed to the inner race of the one-way clutch. In the conventional manner the clutch 10 is adapted for driving the driven shaft 6 in one angular direction with the driven shaft 6 being free for coasting when the intermediate shaft 8 moves relative thereto in the opposite angular direction. Oscillatory angular movement of the intermediate shaft 8 thereby produces unidirectional angular movement of the driven shaft 6.

A slide or carriage 4 is mounted in a dovetailed groove 11 in an enalrged flange 3 of the drive shaft for movement radially of the axis of the drive shaft. A diametrically extending spindle 12 is rotatably supported in bearing brackets 13 of the flange 3 for extension through a radial bore in the slide 4. On the protruding ends of the spindle 12 are mounted pinion gears 14, 15 with the gear 14 being keyed, or otherwise suitably fixed, to the spindle for unitary movement therewith and the gear 15 being freely mounted on the spindle. The spindle is provided with reverse helical grooves or reversing threads of opposite hand that receive a pawl (not shown) carried by the slide 4 so that upon rotation of the spindle, the slide is driven along the spindle radially of the drive shaft axis, with automatic reversing of the direction of movement of the slide at its terminal positions without a change in the direction of rotation of the spindle.

Figure 2:
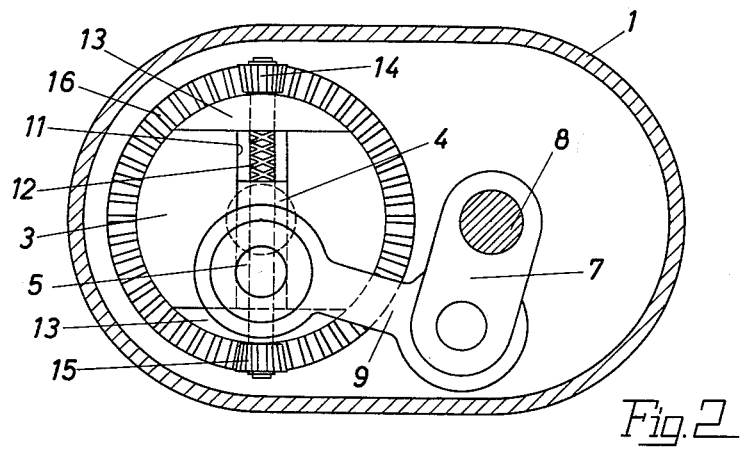
FIG. 2 is a transverse section view, partly broken away, taken along the line 2—2 of FIG. 1.

A connecting rod or rocker lever 9 is pivotally mounted at one end by a suitable bearing on an axially projecting stud 5 of the slide 4. The opposite end of the connecting rod 9 is eccentrically connected to the intermediate shaft 8 through a pivotal connection with a lever arm 7 fixed to the intermediate shaft. Accordingly, rotational movement of the drive shaft 2 is translated into oscillatory movement of the intermediate shaft 8 by the connecting rod 9, with the amplitude of the oscillatory movement of the intermediate shaft being dependent upon the distance between the axis of the stud 5 and the axis of the drive shaft 2. FIG. 2 shows the stud 5 in its outer terminal position where its axis is the furthest from the drive shaft axis. At its inner terminal position the stud 5 is coaxial with the shaft 2 whereby a neutral setting for the transmission is provided.

Figure 4:
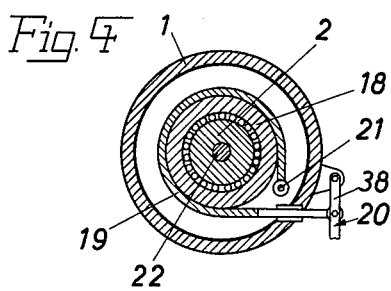
FIG. 4 is a transverse section view, partly broken away, taken along the line 4—4 of FIG. 1.

Coaxially mounted on the drive shaft 2 is a hollow stub shaft 18 with a radially and axially extending flange 17 having a gear 16 in mesh with the pinions 14 and 15. The stub shaft 18 is mounted within the housing and upon the drive shaft 2 by suitable bearings for allowing relative rotational movement between the drive and stub shafts. For effecting braking of the stub shaft 18 there is provided a brake band 19 partially surrounding the stub shaft. As seen in FIG. 4, one end of the brake band 19 is secured by a fastener 21 to the housing, and the other end of the brake band is connected to an actuating lever 20 pivotally supported externally of the housing. With movement of the lever 20 outwardly from the housing, the brake band is tightened for braking the stub shaft 18.

Figure 3:
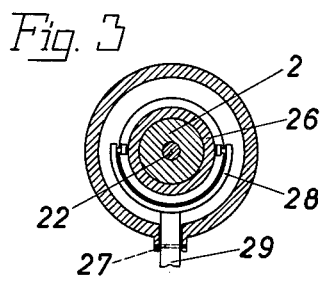
FIG. 3 is a transverse section view, partly broken away, taken along the line 3—3 of FIG. 1.

For locking the slide 4 against inadvertent radial movement within the groove 11, a locking rod 22 slidably received within a central bore in the drive shaft 2 is biased by a compression coil spring 23 into engagement with the slide. Where desirable, the inner face of the slide 4 may be notched or specially faced and the locking rod 22 pointed or specially faced to increase the locking engagement therebetween. For releasing the slide, the rod 22 is moved against the compression spring 23 by an actuating lever 29 pivotally mounted on the housing by a pin 27 (FIG. 3). The actuating lever 29 has at its inner end a yoke 28 with inwardly extending rollers received within an annulus of a collar 26 slidably mounted on the drive shaft 2. The collar 26 is fixed to the locking rod 22 by means of a transverse pin 24 extending through radial openings in the collar and rod and received within a transverse slot 25 in the drive shaft. Accordingly, by moving the outer end of the actuating lever 29 to the right (as seen in FIG. 5) the slide 4 will be released. A control arm 30, as best seen in FIG. 14, is pivotally mounted to the outer end of the actuating lever 29 and is spring-biased in the counterclockwise direction (FIG. 14) by a spring 35 against a stop 37.

In normal operation the brake band 19 is released and the locking rod 22 is in engagement with the slide to maintain it in a fixed position. The spindle 12 therefore cannot rotate and the pinion 14 therefore causes the stub shaft 18 to revolve with the drive shaft 2. The rotary motion of the drive shaft 2 is converted into angular oscillatory movement of the intermediate shaft 8 by the connecting rod 9 and the oscillatory movement is translated by the clutch 10 into unidirectional angular movement of the driven shaft 6. The drive ratio between the drive shaft 2 and driven shaft 6 is dependent upon the distance between the axis of the stud 5 and the axis of the drive shaft 2, with a decrease in drive ratio and an increase in torque being provided as the distance is reduced.

For shifting the transmission, the locking rod 22 is disengaged and the brake band 19 is tightened. The stub shaft 18 is thereby caused to revolve relative to the drive shaft 2 to rotate the pinion 14 and spindle 12 and impart displacement of the slide 4. Adjustment of the driven shaft torque and speed can thereby be readily accomplished.

Figure 13:
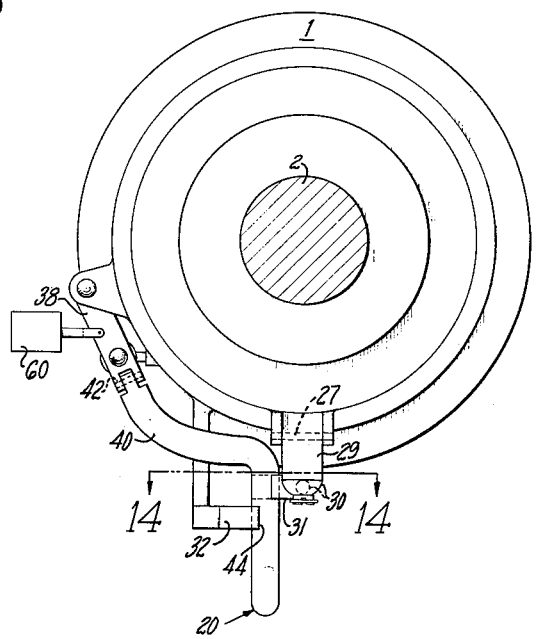
FIG. 13 is an enlarged transverse section view taken along the line 13—13 of FIG. 1.
Figure 14:
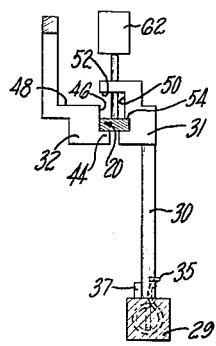
FIG. 14 is a fragmentary section view taken along the line 14—14 of FIG. 13.

Control of the locking rod 22 and the brake band 19 are coordinated by a shifting mechanism best shown in FIGS. 13 and 14. The actuating lever 20 of the brake band has an upper link 38 pivotally connected to the housing and a lower link 40 pivoted to the upper link by a pin 42 for allowing only longitudinal movement of the lower link relative to the upper link. The lower link has a downwardly extending portion engageable with a guide 32 fixed to the housing and a control piece 31 on the control arm 30 and further provides a handle for manual operation. The fixed guide 32 has a shoulder 44 providing a stop for the lower link 40 in one longitudinal direction of movement of the link. Perpendicularly related guide surfaces 46 and 48 on the guide 32 control the movement of the control arm, first longitudinally along the surface 46 and then transversely along the surface 48. The control piece 31 has a pair of mutually perpendicular surfaces 50 and 52 complementary to the guide surfaces 46, 48 and engageable by the control arm 20, and a recess or slot 54 adapted for receiving the control arm when it is in abutment with the shoulder 44 of the guide 32.

The control piece 31, the fixed guide 32 and the control arm 20 are shown in FIGS. 6 through 12 with the control piece in several positions as determined by the position of the control arm 20. The normal operating position of the shifting mechanism is shown in FIG. 6 at which position the locking rod 22 is in engagement with the slide 4 and the brake band 19 is released. For releasing the slide lock, the control arm 20 is moved longitudinally in the X direction (as seen in FIG. 7) and is then moved transversely in the Y direction (as seen in FIG. 8) for tightening the brake band and thereby change the drive ratio of the transmission. For resuming normal operation after the proper drive ratio is selected, the control arm 20 is moved transversely (as seen in FIGS. 9 and 10) and then longitudinally to its initial position (as seen in FIG. 11). During this latter movement of the arm 20, the control piece 31 is pivoted (as shown exaggerated in FIG. 10) against the bias of spring 35. Upon return of the control arm 20 to its initial position the control arm drops into the slot 54 of the control piece 31 and the control piece 31 and control arm 30 pivot under the bias of the spring 35 against the stop 37.

Remote control of the control arm 20 can be provided, as seen in FIGS. 13 and 14, by a pair of solenoids 60, 62 connected to the upper and lower links 38, 40, respectively, of the control arm 20. By simultaneous energization of the solenoids 60, 62 the control arm 20 can be moved to a position, as seen in FIG. 12, for operating the brake band 19 and releasing the locking rod. Such operation would have utility, for example where the transmission of the present invention was used in a vehicle, for automatically shifting the transmission to neutral upon the actuation of the brake of the vehicle.

It can therefore be seen that the infinitely variable transmission of the present invention can be manually or automatically controlled for rapidly and accurately setting a drive ratio between a neutral setting and a designed maximum setting. Nonetheless, the infinitely variable transmission has a compact arrangement with few movable parts providing a positive drive through gear ratios between a neutral and a predesigned maximum without the requirement of having a disengageable clutch.

As will be apparent to persons skilled in the art, various modifications and adaptations of the structure above described will become readily apparent without departure from the spirit and scope of the invention, the scope of which is defined in the appended claims.

We claim:

1. An infinitely variable transmission for translating angular movement from a rotatable drive member to a rotatable driven member comprising, a slide mounted on the drive member for movement laterally of the axis thereof, a connecting rod pivotally mounted to the driven member eccentrically of the axis thereof and to the slide, first and second pivotally mounted lever members, means operated by said first lever member for adjusting the slide laterally on the drive member, locking means for locking the slide against lateral movement, means operated by said second lever member for unlocking the slide for lateral movement, and control means operatively connected to said first and second levers for selectively actuating the lever members for unlocking the slide and laterally adjusting the slide on the drive member.

2. An infinitely variable transmission for translating angular movement from a rotatable drive member to a rotatable driven member comprising, a slide mounted on the drive member for movement laterally of the axis thereof, a connecting rod pivotally mounted to the driven member eccentrically of the axis thereof and to the slide, control means for moving the slide laterally on the drive member, means for locking the slide against lateral movement, and electromagnetic operated means for unlocking the slide and for laterally moving the slide on the drive member.

3. An infinitely variable transmission for translating angular movement from a rotatable drive member to a rotatable driven member comprising, a spindle mounted on the drive member for rotation about an axis extending radially of the axis of the drive member, a slide associated with the spindle mounted on the drive member for reciprocable movement parallel to the spindle axis, means including reversing threads of opposite hand on the spindle for reciprocating the slide in opposite radial directions upon rotation of the spindle in one rotational direction, a connecting rod pivotally mounted to the driven member eccentrically of the axis thereof and to the slide, and means for rotating the spindle in said one rotational direction to thereby radially adjust the slide and vary the drive ratio of the transmission.

4. The infinitely variable transmission of claim 1 wherein the means for rotating the spindle comprises a first gear fixed to the spindle, a second gear mounted coaxially with the drive member in mesh with the first gear, and means for braking the rotation of the second gear.

5. An infinitely variable transmission for translating angular movement from a rotatable drive member to a rotatable driven member comprising, a slide mounted on the drive member for movement laterally of the axis thereof, a connecting rod pivotally mounted to the driven member eccentrically of the axis thereof and to the slide, control means for moving the slide laterally on the drive member, and means for locking the slide against lateral movement comprising means mounted on the drive shaft shiftable along the axis thereof in one axial direction for unlocking the slide, means urging the shiftable means in the other axial direction for locking the slide, and means for moving the shiftable means in said one axial direction for unlocking the slide.

6. An infinitely variable transmission for translating angular movement from a rotatable drive member to a rotatable driven member comprising, a slide mounted on the drive member for movement laterally of the axis thereof, a connecting rod pivotally connected to the driven member eccentrically of the axis thereof and to the slide, first operator means for moving the slide laterally on the drive member, means for locking the slide against lateral movement including means mounted on the drive shaft shiftable along the axis thereof in one axial direction for unlocking the slide, means urging the shiftable means in the other axial direction for locking the slide, and second operator means for moving the shiftable means in said one axial direction for unlocking the slide, and manually operable means for actuating the first and second operator means to effect unlocking of the slide and movement of the slide laterally on the drive member.

References Cited by the Examiner

UNITED STATES PATENTS

| 1,700,967 | 2/29 | Baerbalck | 74—600 |
| 1,765,806 | 6/30 | Schroder | 74—58 |

FOREIGN PATENTS

| 576,821 | 5/24 | France. |
| 41,063 | 11/13 | Sweden. |

BROUGHTON G. DURHAM, *Primary Examiner.*